United States Patent [19]

Hiraike

[11] Patent Number: 4,461,559
[45] Date of Patent: Jul. 24, 1984

[54] EXPOSURE ASCERTAINING DEVICE FOR CAMERAS

[75] Inventor: Fumiaki Hiraike, Hachioji, Japan

[73] Assignee: Konishiroku Photo Industry Co., Ltd., Tokyo, Japan

[21] Appl. No.: 467,792

[22] Filed: Feb. 18, 1983

Related U.S. Application Data

[63] Continuation of Ser. No. 251,749, Apr. 7, 1981, abandoned.

[30] Foreign Application Priority Data

Apr. 15, 1980 [JP] Japan .................................. 55-48729
Apr. 15, 1980 [JP] Japan .................................. 55-48732

[51] Int. Cl.³ ........................ G03B 7/099; G03B 17/18
[52] U.S. Cl. .................................... 354/432; 354/465; 354/477
[58] Field of Search .................... 354/23 R, 31, 56, 59

[56] References Cited

U.S. PATENT DOCUMENTS

| | | | |
|---|---|---|---|
| 3,690,241 | 9/1972 | Nomura | 354/31 |
| 3,699,864 | 10/1972 | Shimomura | 354/23 R |
| 3,872,484 | 3/1975 | Hashimoto et al. | 354/56 X |
| 4,172,643 | 10/1979 | Schulz et al. | 354/56 X |

Primary Examiner—Michael L. Gellner
Attorney, Agent, or Firm—Jordan B. Bierman; Linda Bierman

[57] ABSTRACT

An exposure ascertaining device for cameras in which the movement of a movable member adapted to be moved when the film is exposed is ascertained on the basis of an output from a photoelectric element disposed in a position where said photoelectric element can receive the incident light advancing toward a film-set side of the camera. The photoelectric element is provided on the movable member, or disposed in a position where it can receive that part of the incident light which does not enter the image forming part of the surface of a film.

2 Claims, 6 Drawing Figures

EXPOSURE ASCERTAINING DEVICE FOR CAMERAS

This application is a continuation of application Ser. No. 251,749, filed Apr. 7, 1981, now abandoned.

BACKGROUND OF THE INVENTION

1. Field of the Invention

This invention relates to an exposure ascertaining device for cameras.

2. Description of the Prior Art

A conventional camera is not provided with a means for making sure that a film has been exposed without trouble in a photographing operation.

Conventional cameras include a camera in which sequential photographing actions are made by mechanical interlocking actions. In a case where even one movable member of such type of camera along a plurality of movable members thereof, which are moved when a film is exposed, has got out of order to be stopped, other movable members operatively connected to the first-mentioned movable member also come to a stop. This causes a shutter to become inoperable at last. In many cases, an accident to such a camera comes under the user's notice only when a shutter trouble as mentioned above occurs. In addition, it would occur that a shutter trouble, in which a shutter is stopped in an opened state, is left unnoticed to result in a loss of an opportunity of taking photographs and wasteful consumption of a film.

Conventional cameras also include a camera in which sequential photographing actions are made by an electric control circuit. In such type of camera, operational instructions are given to each movable member thereof by the control circuit in accordance with sequential photographing actions to thereby move the members. Therefore, even in a case where one of these members gets out of order to be stopped when a film is exposed, the other members are moved normally. Such a trouble would not come to the user's notice until the film has been developed.

SUMMARY OF THE INVENTION

An object of the present invention is to provide an exposure ascertaining device which prevents the above-mentioned troubles from being left unnoticed, and which thus causes a loss of an opportunity of taking photographs and a wasteful consumption of a film.

Another object of the present invention is to provide an exposure ascertaining device for cameras, comprising a photoelectric element provided on a movable member adapted to be moved when a film is exposed during a photographing operation, the exposure of the film being ascertained on the basis of an output from the photoelectric element, the level of which is varied in accordance with the movement of the movable member; or a photoelectric element is disposed in a position where the photoelectric element can receive that part of the incident light advancing toward a film-set side of the camera which does not enter the surface of the film, the movement of a movable member adapted to be moved when the film is exposed being ascertained on the basis of an output from the photoelectric element.

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
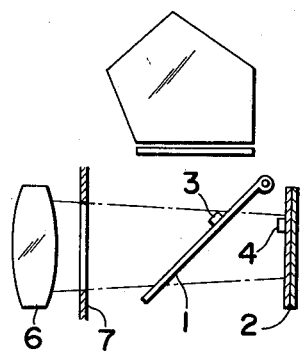
FIGS. 1–3 are diagrammatic side elevational views of certain principal portions of cameras, illustrating various examples of an arrangement of photoelectric elements according to the present invention.

In an embodiment shown in FIG. 1, photoelectric elements 3, 4 are provided in a movable finder mirror 1 which is one of movable members of a single-lens reflex camera, and which is adapted to be moved when a film is exposed during a photographing operation, and on that portion of the front surface of a front curtain of a focal-plane shutter 2 which receives the incident light. In an embodiment shown in FIG. 2, a photoelectric element 5 is provided on that portion of an oscillatory arm 1' which receives the incident light when a mirror 1 is upwardly oscillated. The arm 1' is adapted to be oscillated upwardly in the same manner as the mirror 1 after the completion of the upward oscillation of the latter, and to be oscillated to its original position simultaneously with or prior to a returning oscillatory movement of the mirror 1. Such an oscillatory arm 1' is also one of movable members adapted to be moved when the film is exposed during a photographing operation.

Figure 2:
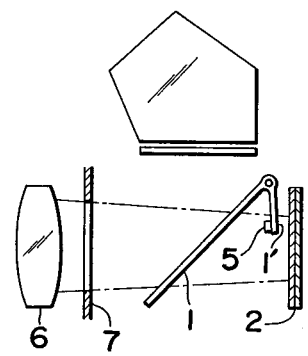
Figure 4:
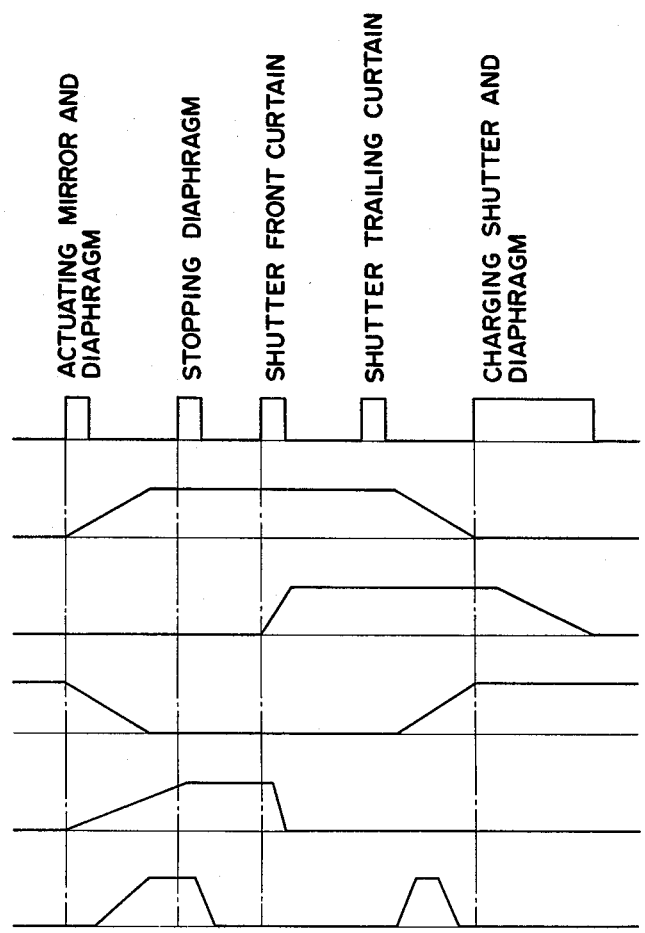
FIG. 4 is a timing chart of an operation instructing signal, the movements of movable members and an output from the photoelectric element shown in FIGS. 1 and 2, in a camera in which sequential photographing actions are made by an operation instructing signal outputted from a control circuit.

Outputs from the photoelectric elements 3–5 provided on movable members in such a manner as shown in FIGS. 1 and 2 are varied as shown in FIG. 4, in accordance with the movements of the movable members. Therefore, the movements of the movable members occurring when a release operation is conducted can be ascertained by the detection-display circuit shown in FIG. 6, on the basis of outputs from the photoelectric elements 3–5 and an operation instructing signal.

When the movable finder mirror 1 is oscillated quickly in the upward direction when the film is exposed, the light passed through a photographing lens 6 and a diaphragm 7 enters the film-set side of the camera. The light thus entering the film-set side of the camera is varied in accordance with the upward movement of the mirror 1.

Figure 5:
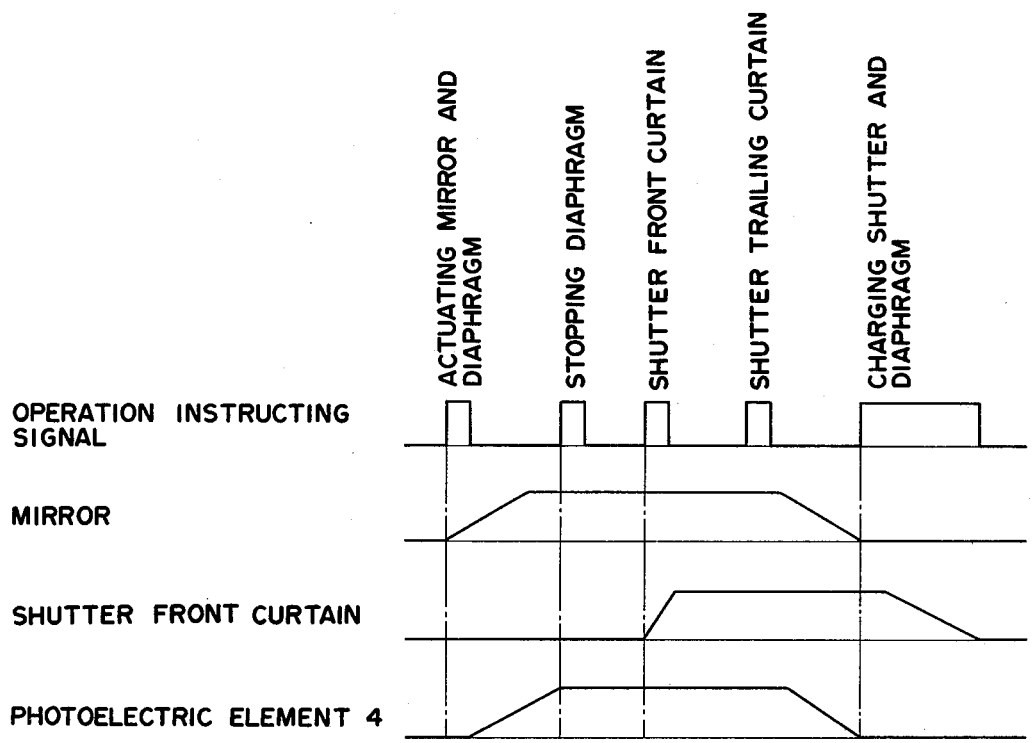
FIG. 5 is a timing chart of an operation of the embodiment shown in FIG. 3.

In another embodiment of the present invention, a photoelectric element 8 is provided in a position which permits the photoelectric element 8 to receive the incident light advancing toward the film-set side of the camera and which is out of an optical path in which that part of the incident light which enters the surface of the film advances. In this embodiment, the photoelectric element 8 receives the incident light which is passed through the photographing lens 6 the moment the mirror 1 is upwardly oscillated, without exerting a bad influence upon the exposure of the film. As may be noted from FIG. 5, an output from the photoelectric element has information on the movement of the mirror 1.

In a camera in which, for example, a diaphragm 7 is set by adjusting the same from a maximum degree of opening thereof which is greater than an opening value of a lens, a photoelectric element is provided in a position where the photoelectric element receives the light advancing through that portion of the lens which is defined by the maximum degree of opening of the diaphragm and the opening value of the lens. Thus, information on the movement of the diaphragm can be obtained.

Figure 6:
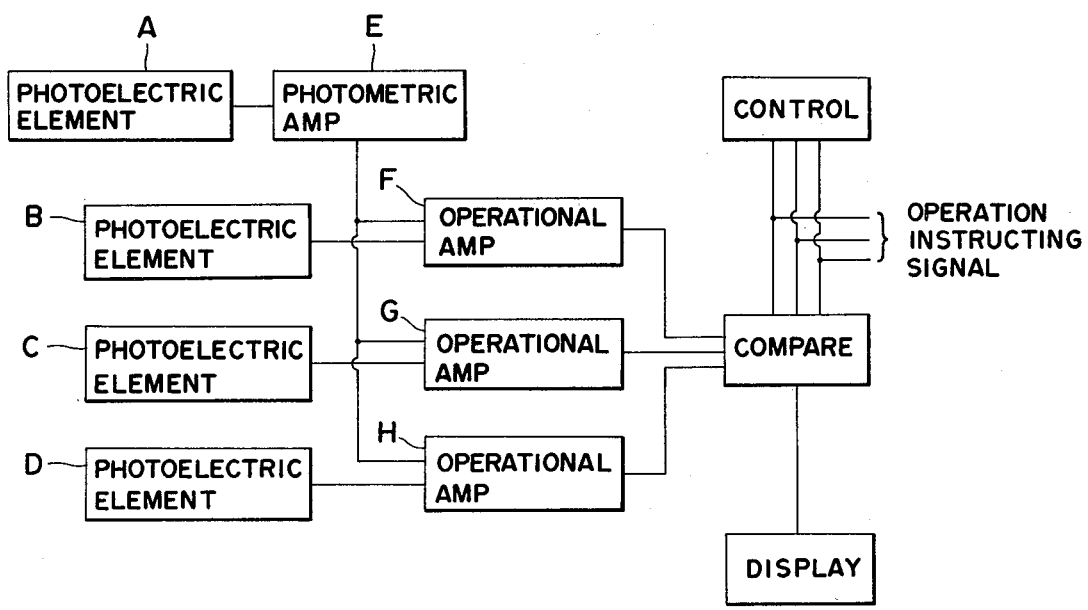
FIG. 6 is a block diagram of a detection-display circuit for displaying the movements of movable members on the basis of an output from the photoelectric element.

The information mentioned above from the photoelectric elements is processed by a circuit shown in FIG. 6, to display the information on the movements of the movable members, such as diaphragm and movable finder mirror, as well as the correctness of the movements of these members.

Figure 3:
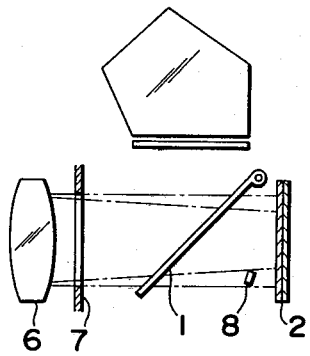

Referring to FIG. 6, a symbol A denotes an exposure condition setting photoelectric element, B, C, D photoelectric elements, which correspond to the photoelectric elements shown in FIGS. 1-3, for detecting the movements of movable members, E a photometric amplifier circuit for amplifying an output from the photoelectric element A, and F, G, H operational amplifier circuits for amplifying outputs from the photoelectric elements B, C, D and subjecting the resulting signals to conversion on the basis of an output from the photometric amplifier circuit E. Outputs from the operational amplifier circuits F–H are inputted into a comparator, in which the inputs from these amplifier circuits F–H are compared with an output from a control circuit which is adapted to output an operation instructing signal. When a release has been operated, a signal representation of the results of movements of the movable members is outputted into a display. The display is designed in such a manner that, when the signal received thereby indicates that, for example, one of the movable members failed to be moved, the display is operated so as to turn on or off a display lamp, change a display plate, turn on a buzzer, inhibit the movement of a movable member which is to be moved after the movable member in question, or inhibit the advancing of the film for the following photographing operation. The results of movements of the movable member are thus informed to the photographer. The display referred to above includes any means having the above-described function, and a drive means for actuating the display means.

The photographer can be informed of the occurrence of an accident to his camera immediately owing to the above-described system, so that the repeating of useless photographing operations can be prevented.

The exposure ascertaining device according to the present invention can be applied to not only such a camera as mentioned above but also a camera provided with a lens shutter. In a camera provided with a lens shutter, a photoelectric element may be set on that surface of an operable vane which faces a film, to detect variation in an output from the photoelectric element, which occurs in accordance with opening and closing operations of the operable vane. When the exposure ascertaining device according to the present invention is applied to a single-lens reflex camera provided with a lens shutter, a photoelectric element is set on a movable shielding plate disposed in front of a film, to detect and display the movement of the shielding plate.

The exposure ascertaining device may consist of a plurality of photoelectric elements provided on a plurality of movable members, and a detection-display unit adapted to display information on the movement of each of the movable members. This exposure ascertaining device may also be adapted to display not only the movements of the movable members but also the abnormality of the velocity of movements of the movable members by comparing the time of duration of an output from a photoelectric element with, for example, the output timing of an operation instructing signal from the control circuit.

In the example shown in FIG. 1, an output from the photoelectric element 4 provided on a shutter front curtain gives information on the upward movement of a mirror, and information on the movement of the shutter front curtain when the mirror has been moved upwardly, so that the movements of the mirror and shutter front curtain can be displayed on the basis of an output from the photoelectric element 4 set on the shutter front curtain.

In a camera shown in FIG. 2, which has a large space between the mirror 1 in an upwardly moved state and a photographing optical path, an oscillatory arm 1' may be provided in such a manner that the arm 1' can be oscillated with the mirror 1; or a photoelectric element 5 may be provided in a position where the photoelectric element 5 can receive the incident light while the mirror 1 and oscillatory arm 1' are oscillated upwardly, or downwardly to return to their original positions.

The photoelectric element used in the present invention to detect the movement of a movable member may be adapted to be used also as an exposure condition setting photoelectric element.

While the described embodiments represent the preferred form of the present invention, it is to be understood that modifications will occur to those skilled in the art without departing from the spirit of the invention. The scope of the invention is therefore to be determined solely by the appended claims.

What is claimed is:

1. In a camera, a movable element adapted to be moved from one position to another when the film is exposed, a photoelectric element positioned to receive the incident light advancing toward the film-set side of the camera and the photoelectric element is positioned at such a point as to change the amount of light received by the photoelectric element as said movable element moves from one position to the other, whereby the output of said photoelectric element is dependent upon the sequential operation of the movable element during exposure of the film, means measuring the output of said photoelectric element, means responsive to said output measuring means for ascertaining the movement of said movable element, and further means responsive to said last means for alerting a picture-taker of a possible malfunction in the movement of said movable element, said last means comprising a comparator, a source of control signals indicating the normal operation of the camera, means feeding said control signals and the output of said photoelectric element to said comparator, and means connected to the output of said comparator for producing an operative signal when the output of said photoelectric element does not match the output of said control signals, whereby the operator of the camera is alerted to the malfunction of the movable element of the camera.

2. In a camera, a movable element adapted to be moved from one position to another when the film is exposed, a photoelectric element positioned to receive the incident light advancing toward the film-set side of the camera and the photoelectric element is positioned at such a point as to change the amount of light received by the photoelectric element as said movable element moves from one position to the other, whereby the output of said photoelectric element is dependent upon the sequential operation of the movable element during exposure of the film, means measuring the output of said photoelectric element, means responsive to said output measuring means for ascertaining the movement of said movable element, and further means responsive to said last means for alerting a picture-taker of a possible malfunction in the movement of said movable element, said last means comprising a comparator, a source of control signals indicating the normal operation of the camera, means feeding said control signals and the output of said photoelectric element to said comparator, and display means connected to the output of said comparator for producing a signal when the output of said photoelectric element does not match the output of said control signals, whereby the operator of the camera is alerted to the malfunction of the movable element of the camera.

* * * * *